United States Patent [19]
McClure

[11] Patent Number: 5,605,095
[45] Date of Patent: Feb. 25, 1997

[54] COMPACTION SENSOR FOR ROUND BALER

[75] Inventor: John R. McClure, New Holland, Pa.

[73] Assignee: New Holland North America, Inc., New Holland, Pa.

[21] Appl. No.: 600,574

[22] Filed: Feb. 13, 1996

[51] Int. Cl.$^6$ .................................................. B30B 15/00
[52] U.S. Cl. ............................ 100/99; 100/88; 56/341
[58] Field of Search ......................... 100/4, 5, 88, 99; 56/341

[56] References Cited

U.S. PATENT DOCUMENTS

| | | | |
|---|---|---|---|
| 4,224,867 | 9/1980 | Gaeddert et al. | 100/88 |
| 4,517,795 | 5/1985 | Meiers | 56/341 |
| 4,624,179 | 11/1986 | Drutel et al. | 100/99 |
| 4,686,820 | 8/1987 | Andra et al. | 56/341 |
| 4,748,801 | 6/1988 | Sheehan et al. | 56/341 |
| 4,850,271 | 7/1989 | White et al. | 100/88 |
| 4,870,812 | 10/1989 | Jennings et al. | 56/341 |
| 5,131,214 | 7/1992 | Vermeer | 56/341 |
| 5,182,987 | 2/1993 | Viaud | 100/99 |
| 5,226,359 | 7/1993 | Rempe | 100/99 |
| 5,444,969 | 8/1995 | Wagstaff et al. | 56/341 |

*Primary Examiner*—Stephen F. Gerrity
*Attorney, Agent, or Firm*—Larry W. Miller; Frank A. Seemar; John W. Stader

[57] ABSTRACT

A round baler having a main frame, a bale forming chamber on the main frame, a pickup for feeding crop material into the chamber, and a tailgate pivotally connected to the main frame for rearwardly discharging completed bales. The chamber is defined by an apron extending around a plurality of guide rolls on the periphery of the chamber, the tailgate, and a floor. The bale forming chamber varies in size from a core starting position to a full bale position. A crop loading monitor having sensors in the bale forming chamber provides signals representing compactness of the crop material during bale formation. The signals are utilizable by the operator to enhance his capabilities for making properly shaped bales.

10 Claims, 5 Drawing Sheets

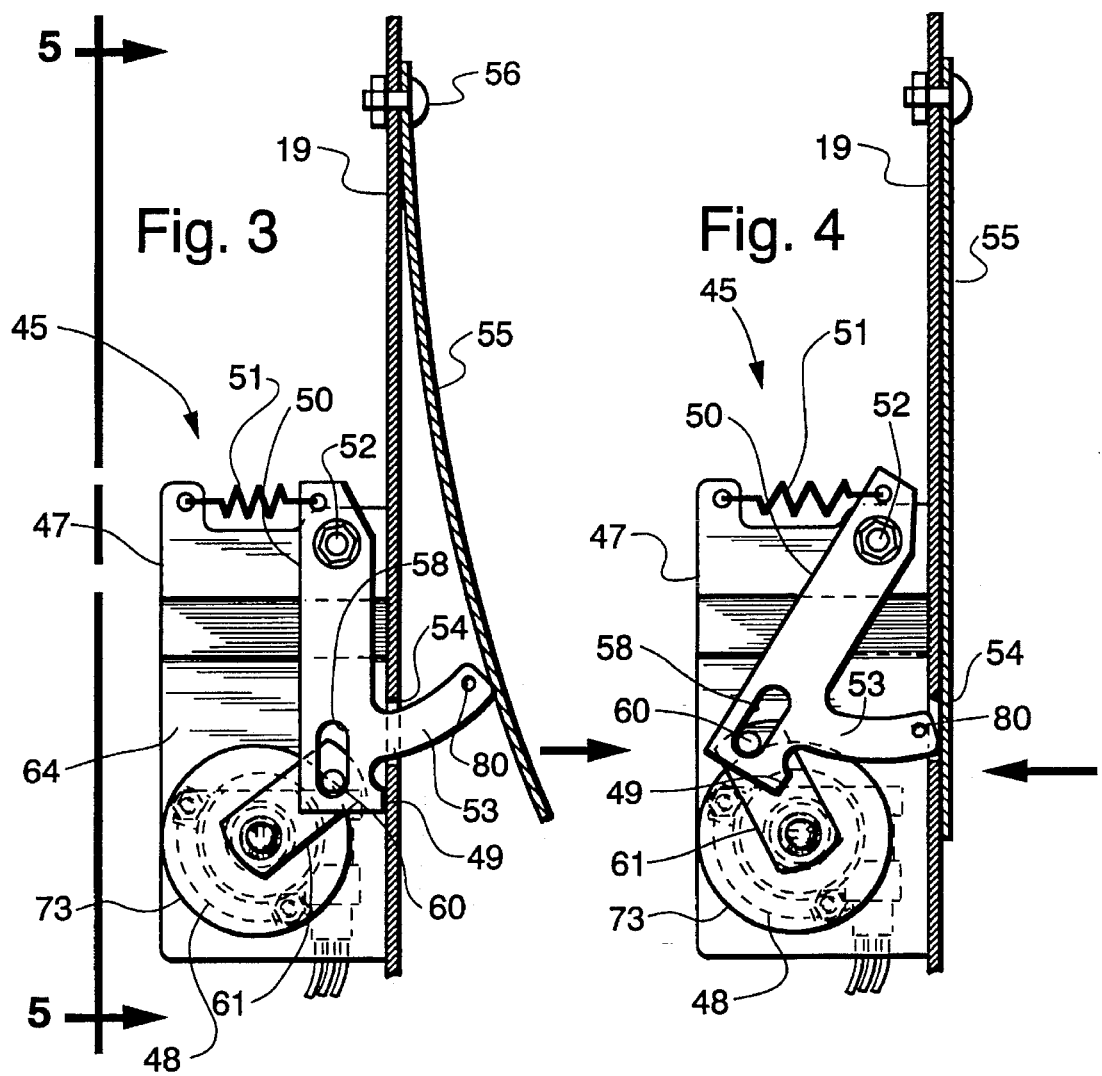
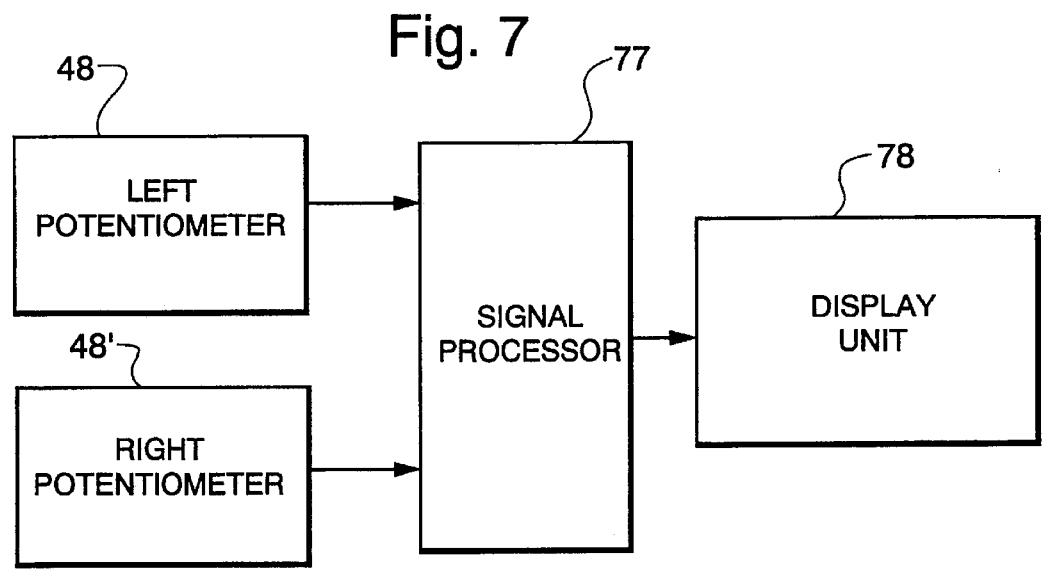

COMPACTION SENSOR FOR ROUND BALER

FIELD OF THE INVENTION

The present invention relates generally to round balers and more particularly to sensor apparatus for monitoring the degree of compaction of crop material in a round baler chamber as a bale is being formed.

BACKGROUND OF THE INVENTION

It is common for round balers to have a bale forming chamber defined by a pair of opposing side walls associated with an array of side-by-side belts, transverse slats trained on chains, a plurality of rolls or a combination of these various elements, e.g., rolls and belts. During field operation, windrowed crop material such as hay is picked up from the ground and fed into a fixed or variable diameter chamber. The hay is then formed into a cylindrical package, wrapped with twine, net or the like and ejected onto the ground for subsequent handling.

Because it is not uncommon for windrows of crop material to be narrower than the width of the bale forming chamber, it is necessary for the operator to observe the shape of the cylindrical package as it is being formed and to steer the baler along a path that results in uniform transverse distribution of hay to avoid poorly shaped bales. This approach relies on the experience and technique of the operator to determine when to shift the position of the baler relative to the windrow. The lack of exactness, inability to observe the bale shape, reliance on operator skill, and operator fatigue all contribute to the potential for improper feeding resulting in misshaped bales.

During operation of belt type balers, if a substantially uniform diameter is not maintained during feeding, improper tracking occurs which could lead to belt jamming and damage. In addition, unevenly shaped bales cause low density areas on the outer surfaces. This could result in premature deterioration if the bales are exposed to weather extremes, i.e., bales with such low density areas will not shed water as well as those with an evenly shaped and uniformly compacted surface area.

Many present day balers of the various types mentioned above recognize the need for enhancing bale shape. Systems are employed that address the problem of conveniently and consistently forming bales having a substantially uniform diameter throughout their length. This has been accomplished to a certain degree by utilizing monitoring arrangements to ascertain parameters that in turn are used in the control of functions that have a direct bearing on the shape of bales formed. A bale shape control system of this type is disclosed in U.S. Pat. No. 4,748,801, issued Jun. 7, 1988, 1979 in the name of Ronald T. Sheehan, et al. This system includes first and second indicator lights, and bale diameter monitoring apparatus for alternately generating signals in response to predetermined incremental expansion of the bale forming chamber. This enables the operator to position the baler to feed crop to one side of the bale forming chamber when a signal is generated in one indicator and to position the baler to feed crop to the other side of the chamber when a signal is generated in the other indicator.

In U.S. Pat. No. 4,224,867, issued Sep. 30, 1980 in the name of Melvin V. Gaeddert, et al, and U.S. Pat. No. 4,517,795, issued May 21, 1985 in the name of Gerald F. Meiers, similar prior art systems are shown in which a monitor senses tension in belts at both sides of the cylindrical package being formed in the chamber and generates signals directly related to the relative diameters. This enables the operator to steer the baler in a manner that will feed crop material to the area in the chamber that is deficient in an attempt to prevent the bale from becoming improperly shaped.

In another system, disclosed in U.S. Pat. No. 4,686,820, issued Aug. 18, 1987, in the name of Bryan K. Andra, et al, tension on the belts is utilized to generate a signal that is used to control apparatus that varies the path of crop being fed to the bale forming chamber. The baler is driven straight down the windrow, hay is picked up, and as it is being conveyed toward the chamber the stream of hay is selectively deflected into one of three regions of the chamber based on diameter differentials.

In yet another prior art system, disclosed in U.S. Pat. No. 5,131,214, issued Jul. 21, 1992, in the name of Gary J. Vermeer, a crop loading monitor is employed to assist the operator in the formation of round bales. The monitor in this instance comprises an interval timer which signals the operator to direct crop material to alternate sides of the baler at preselected time intervals.

The round baler shape monitoring systems described above either monitor the general baler diameter, various relative diameters or the time interval during which crop is being fed. The present invention is an improvement to a round baler having still another type shape monitoring system, one in which the degree of compaction of crop material in the chamber is monitored. A system of this nature is disclosed in U.S. Pat. No. 5,444,969, issued Aug. 29, 1995 in the name of Robert A. Wagstaff, et al. More particularly, the degree of compaction is sensed by sensors having leaf springs urged against the sides of the cylindrical package of crop material during formation.

SUMMARY OF THE INVENTION

An important object of the present invention is to provide an improved compaction sensor for a monitoring system of the type disclosed in U.S. Pat. No. 5,444,969, resulting in new and useful round baler apparatus with enhanced overall loading performance.

In pursuance of this and other important objects the present invention provides improvements to a round baler having an expandable bale forming chamber including opposing sidewalls between which generally cylindrically shaped packages of crop material are formed, and a crop compaction sensor mounted on at least one of the sidewalls. The sensor includes a leaf spring engageable with the crop material for sensing the degree of compaction of crop material in the vicinity of the sidewall, and a potentiometer having rotatable means for providing a variable signal corresponding to the position of the leaf spring relative to the sidewall. An outermost position of the leaf spring corresponds to little or no crop in the vicinity of the sensor and an innermost position corresponds to maximum crop compaction in the vicinity of the sensor. The present invention more specifically contemplates improved intermediate apparatus for coupling the rotatable means of the potentiometer to the leaf spring, which apparatus includes a mounting bracket, and means for adjustably mounting the potentiometer on the mounting bracket to secure it to the bracket under conditions where the outermost position of the leaf spring corresponds to a range of positions at one end of travel of the rotatable means to enable the outermost position of the leaf spring to be calibrated to correspond to a selected position in the range of positions.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 3 is a view taken in the direction of arrows 3—3 in FIG. 1 and shows the leaf spring in its outermost position.

FIG. 4 is a view similar to FIG. 3 with the leaf spring in its innermost position.

FIG. 7 is a block diagram showing the electronic system used in conjunction with the preferred embodiment of the present invention.

DESCRIPTION OF THE PREFERRED EMBODIMENT

Figure 1:
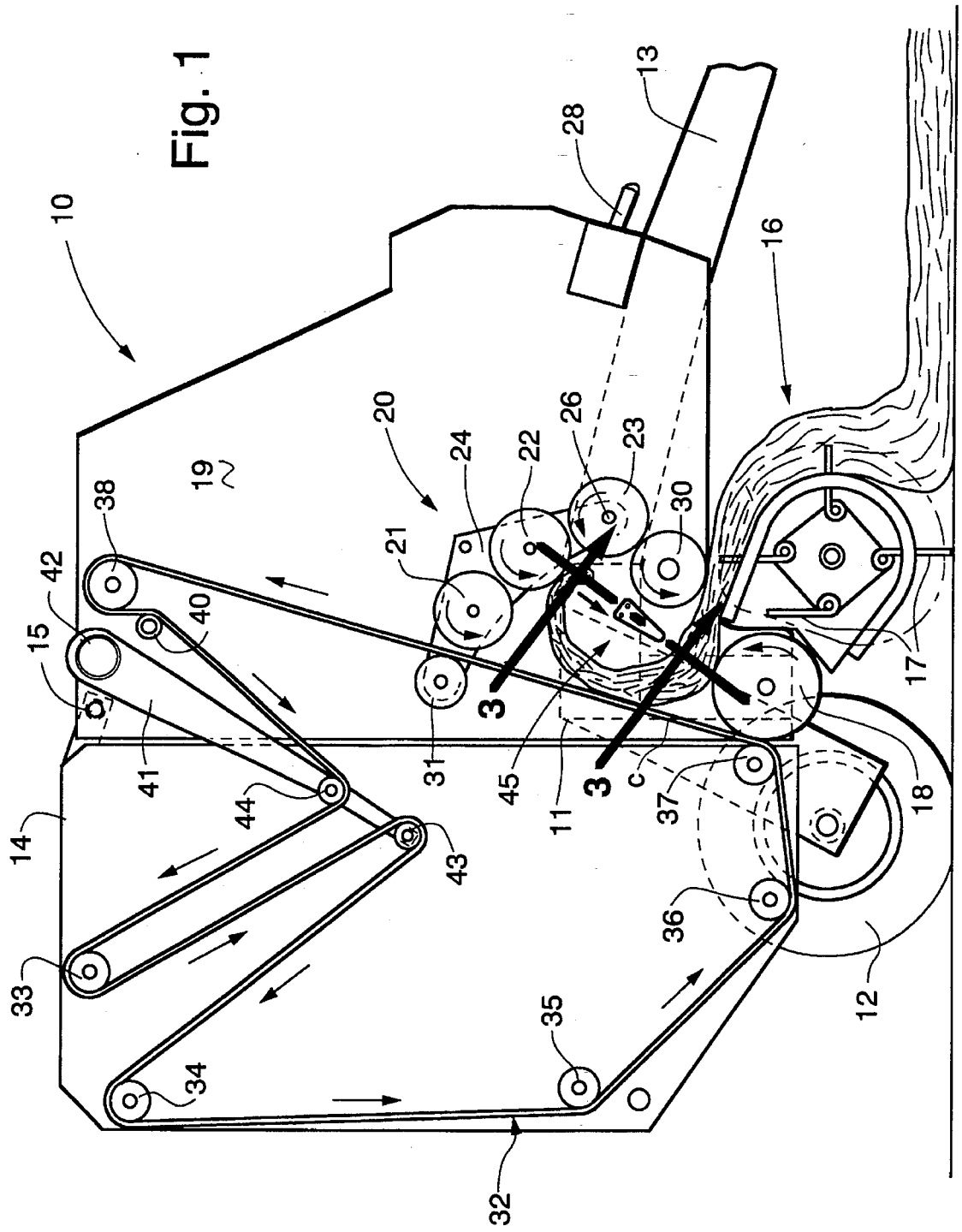
FIG. 1 is a diagrammatic side elevational view of a round baler in which the present invention may be readily incorporated.

Referring now to the drawings for a detailed description of the preferred embodiment of the invention, FIG. 1 shows a round baler 10 of the type having an expandable chamber defined in part by belts and rollers, as disclosed in U.S. Pat. No. 4,870,812, issued Oct. 12, 1989 in the name of Richard E. Jennings, et al. Baler 10 has a main frame 11, including a pair of side walls, supported by a pair of wheels 12 (only one shown). A forwardly mounted tongue 13 is provided on main frame 11 for connection to a tractor. Pivotally connected to a side wall 19 by a pair of stub shafts 15 is a tailgate 14 which is closed during bale formation. Tailgate 14 includes walls coextensive with side walls 19 (one shown) in a conventional manner. A pickup 16, mounted on main frame 11, includes a plurality of tines 17 movable in a predetermined path to lift crop material from the ground and deliver it rearwardly toward a floor roll 18, rotatably mounted on main frame 11.

A chamber for forming bales is defined partly by a sledge assembly 20 comprising a plurality of transversely extending rollers 21, 22, 23 journalled at their ends in a pair of spaced apart arms 24, one of which is shown. These arms are pivotally mounted on stub shafts 26 for providing movement of sledge assembly 20 from the bale starting position shown in FIG. 1 through a continuous range of positions to the full bale position shown in FIG. 2. Rollers 21, 22, 23 are driven in a counter-clockwise direction by conventional means (for example, chains and sprockets) coupled to a drive shaft 28. A starter roll 30, located adjacent roller 23, is also driven counter-clockwise. A freely rotatable idler roller 31, carried by arms 24, moves in an arcuate path with sledge assembly 20.

The bale forming chamber is further defined by an apron 32 comprising a plurality of continuous side-by-side belts supported by guide rolls 33, 34, 35, 36, 37 rotatably mounted in tailgate 14. Apron 32 is also supported on a drive roll 38, mounted on main frame 11. Although apron 32 passes between roller 21 and idler roller 31, it is in engagement only with idler roller 31 and not roller 21 which serves to strip crop material from the belts, in addition to its bale forming function. Suitable coupling means (not shown) connected to drive shaft 28 provide rotation of drive roll 38 causing movement of apron 32 in the directions indicated by the arrows in FIGS. 1 and 2. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner and outer positions shown in FIGS. 1 and 2. Take up arms 41, which carry additional guide rolls 43, 44 for supporting apron 32, are urged toward their inner positions (FIG. 1), by conventional means, e.g., springs.

When the elements of round baler 10 are disposed as shown in FIG. 1, an inner course c of apron 32 extends between guide roll 37 and idler roll 31 to form the rear wall of the core starting chamber while the inwardly facing peripheral surfaces of rollers 21, 22, 23 define in a general manner a rearwardly inclined cooperating front wall. Floor roll 18 defines the bottom of the chamber and with starter roller 30 defines a transverse inlet for crop material.

When round baler 10 travels across a field, pickup tines 17 lift crop material from the ground and deliver it through the inlet. The crop material is carried rearwardly by floor roll 18 into engagement with apron inner course c (FIG. 1) which urges it upwardly and forwardly into engagement with the rollers on sledge 20. In this manner crop material is coiled in a clockwise direction to start a bale core. Continued feeding of crop material into the bale forming chamber by pickup tines 17 causes apron inner course c to increase around a portion of the increasing circumference of the cylindrical package of crop material being formed. Take up arms 41 rotate from their inner positions shown in FIG. 1 toward their outer positions shown in FIG. 2 to provide for such expansion of the inner course of the apron in a well known manner, i.e., in effect the outer course of the belts of apron 32 is diminished in length while the inner course increases a like amount. After a bale has been formed and wrapped, tailgate 14 is opened and the bale is ejected rearwardly. Subsequent closing of tailgate 14 returns the inner and outer courses of apron 32 to the locations shown in FIG. 1.

Figure 2:
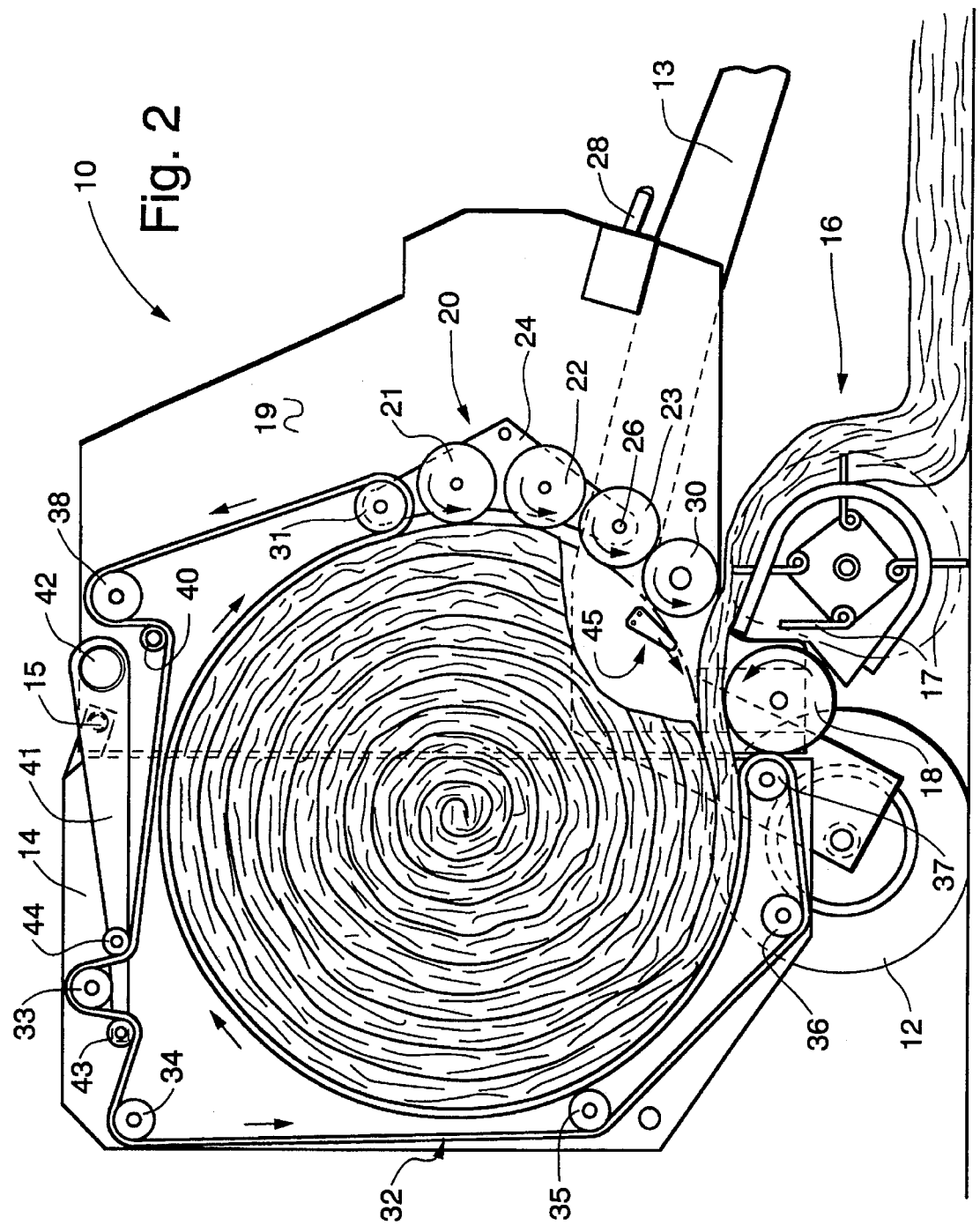
FIG. 2 is similar to FIG. 1 with the bale forming chamber in its full condition.

During bale formation, sledge assembly 20 also moves between a bale starting position (FIG. 1) to a full bale position (FIG. 2). This movement of sledge assembly 20 causes idler roller 31 to move in an arcuate path while maintaining apron 32 in close proximity to roller 21, thereby allowing roller 21 to strip crop material from the belts and prevent or reduce significantly the loss of crop material between roller 21 and apron 32 during formation of a bale. Sledge assembly 20 is pushed outwardly towards its full bale position during bale formation as the crop material expands against rollers 21, 22, 23 and then subsequently is pulled inwardly by apron 32 to the position shown in FIG. 1.

With the above description and general operation of baler 10 as a background, attention is directed to a sensor assembly 45 mounted on side wall 19, shown in FIGS. 1 and 2. Although only one sensor assembly is shown and described, it should be understood that this invention also contemplates the use of a pair of sensors mounted on the inside of opposing side walls of baler 10. A paired arrangement of this nature is disclosed in U.S. Pat. No. 5,444,969, referred to above, which is hereby incorporated by reference.

FIG. 3 shows one sensor assembly, designated by reference numeral 45, mounted on side wall 19, as shown in FIGS. 1 and 2. Another sensor assembly is similarly mounted on the opposing side wall (not shown) of baler 10, in a paired arrangement as mentioned above. For the purposes of this description, only assembly 45 will be described in detail but it is intended that like comments would apply to its counterpart assembly mounted on the opposing side wall.

Figure 5:
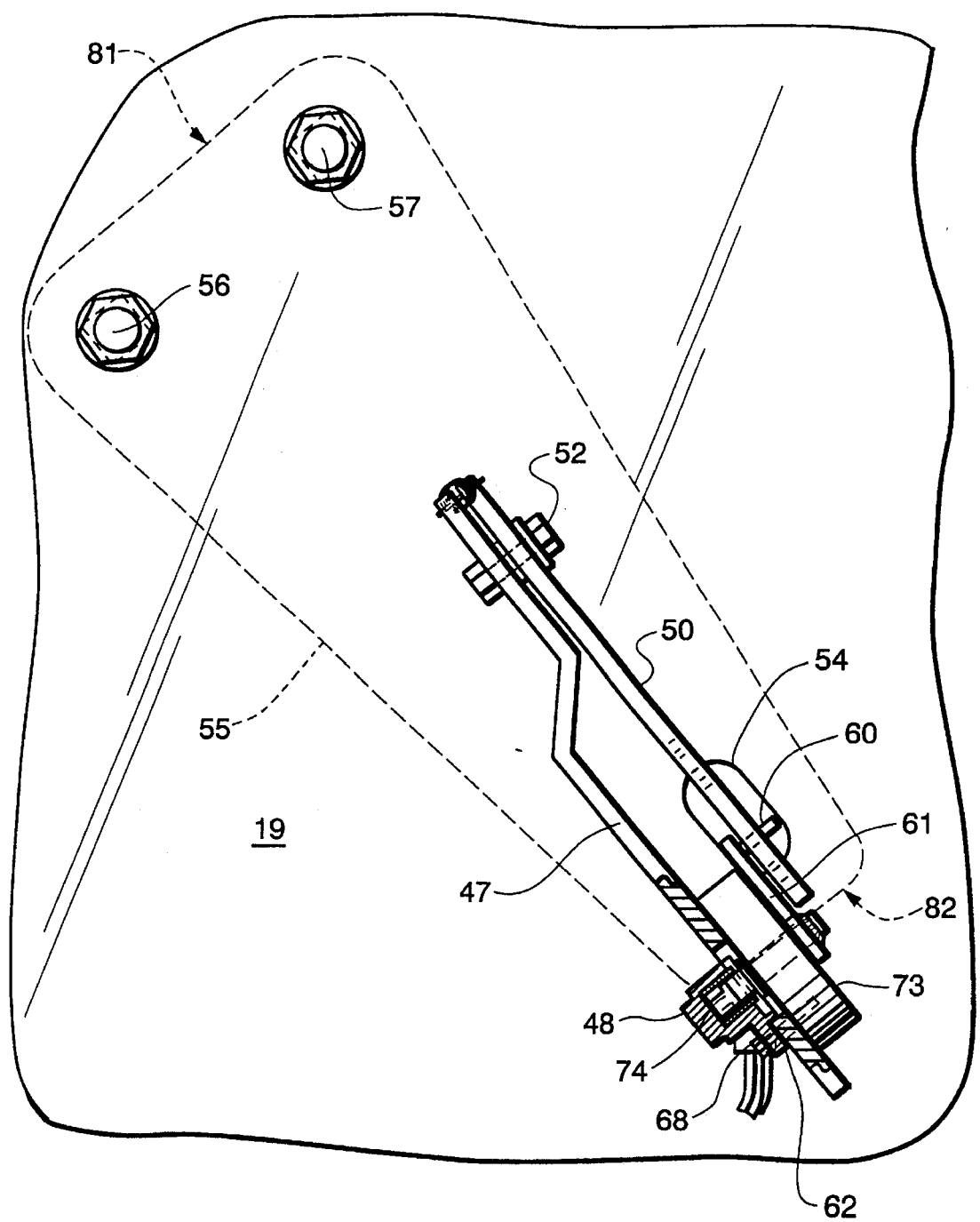
FIG. 5 is a view taken in the direction of arrows 5—5 in FIG. 3.

A mounting bracket 47, affixed to the outside of side wall 19, has mounted thereon a potentiometer 48 and a pivotally mounted sensor plate 50. A spring 51 engages plate 50 to urge it in a counter-clockwise direction about a bolt 52, at which bolt, plate 50 is pivotally mounted to bracket 47. Spring 51, under tension, holds plate 50 against the outside surface of wall 19, at shoulder 49 in the empty chamber condition shown in FIG. 3. An integral finger portion 53 of plate 50 extends through wall 19 via oval shaped aperture 54. Finger 53 is urged toward a leaf spring 55 secured to the inside of side wall 19 by conventional means such as bolts 56, 57 (see FIG. 5). Leaf spring 55 is preset to the position and shape shown in FIG. 3 under no load conditions. Spring 51 in the no load position provides force sufficient to keep shoulder 49 against wall 19. Thus, under conditions where there is no crop material in the vicinity of the sensor in the chamber, the end of finger portion 53 is in contact with leaf spring 55 but applies no force thereagainst.

A slot 58, in plate 50 accommodates an actuator rod 60 extending from a rocker arm 61. When plate 50 swings about pivot 52, rod 60 traverses slot 58 and thereby moves rocker arm 61 between the position shown in FIG. 3 and the position shown in FIG. 4, the latter of which illustrates the position of the elements of sensor assembly 45 under conditions where maximum crop compaction in the vicinity of sensor 45 is sensed.

Potentiometer 48, a commercially available product, is manufactured by CTS Corporation, Elkhart, Id., and designated by Part Number 06543. It is a sealed unit which enhances system integrity in the dust and debris laden environment under which round balers operate, especially in the chamber where straw, hay and various other field harvested crop materials are continuously agitated during formation of the compact cylindrical package. Ears 62, 63 (see FIG. 6) extend from the body of potentiometer 48 to provide for securement to surface 64 of mounting bracket 47. A circular opening 65 in bracket 47 snugly accommodates lip 66 extending circumferentially around a centrally located access opening for potentiometer rotor 67, which is spring loaded to the home position depicted in FIG. 3. The rotor is rotatable against its spring in a conventional manner. The drive angle is approximately 104 degrees in a counterclockwise direction. Thus, in addition to spring 51 providing a force on control arm 50 in the home position, additional force is provided by potentiometer rotor 67 which is urged in a clockwise direction and thereby acts with spring 51 to urge arm 50 in a counter-clockwise direction via rod 60 mounted on rocker arm 61. This force on rod 60 pushes it against the right edge of slot 58 and provides zero tolerance positioning relative to slot 58, regardless of variations in the slot width caused by manufacturing tolerances and wear. Thus, the position of the potentiometer rotor is precisely maintained relative to arm 50 and accordingly, leaf spring 55.

Figure 6:
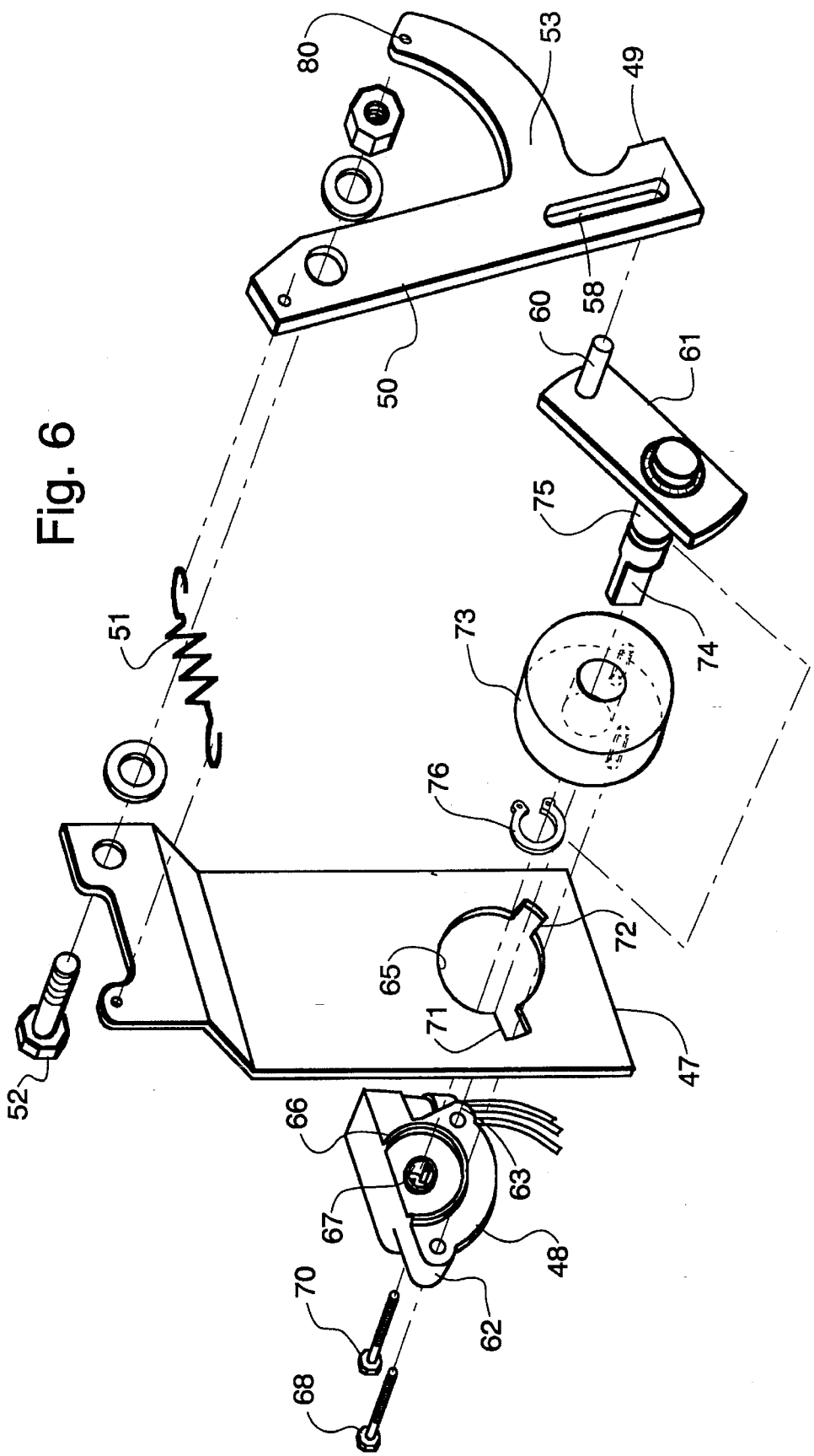
FIG. 6 is an exploded diagrammatic view showing the relationship of certain elements of the preferred embodiment of the present invention.

As depicted in FIG. 6, potentiometer 48 is adjustably mounted to bracket 47 by screws 68, 70 which pass through notches 71, 72 and are secured to steel nut 73. The flat end 74 of pin 75 extends through the center of nut 73 and is secured in place by clip 76 relative to nut 73. The outer diameter of pin 75 is less than the inner diameter of the bore in nut 73 to provide for relative movement when plate 50 is rotated. The rotor access opening 48 accommodates flat end 74 via mating shoulders in the recess of rotor 67, accessible through the opening, such that rotation of plate 50 is transferred to rotation of the potentiometer rotor via rod 60, rocker arm 61, and the flat end of pin 75.

The signals provided by the potentiometers 48, 48' (mounted on opposing sidewall which is not shown) are fed to a signal processor 77 (FIG. 7) and converted to output signals that are displayed by display unit 78. The potentiometer used enables the utilization of micro processing technology that gives precise indications of crop compaction sensed by the unique sensor assembly of the present invention. Further, such precision is significantly enhanced by the ability to calibrate the sensors during assembly and service. When screws 68, 70 are secured in nut 73, it is pulled snugly against mounting bracket 64 with lip 66 nesting in opening 65. By backing out the screws to overcome friction, potentiometer 48 may be rotated in concert with nut 73, relative to bracket 64, over a degree of freedom established by the width of notches 71, 72. This permits the potentiometer to be precisely positioned when arm 50 is in the position shown in FIG. 3, enabling the no bale condition to be accurately and precisely set. Then to simulate full bale position and ascertain the exact signal at the other extreme of travel after calibration of the home end, arm 50 is manually urged to the position shown in FIG. 4 and held there, assisted if desired by a pin inserted across aperture 54, through hole 80, and inwardly of wall 19.

In operation, as mentioned above crop material is picked up by pickup 16 and conveyed by tines 17 to floor roll 18 which urges it against upwardly traveling course c of apron 32. When the bale forming chamber is empty (FIG. 1) material begins to spiral in a clockwise direction until it engages the rollers of sledge assembly 20 which continues to roll it in a spiral fashion causing course c to expand until it reaches the full bale position shown in FIG. 2. During this bale forming operation, crop material adjacent the side walls in the peripheral portion of the cylindrical package being formed is in continuous contact with the leaf spring 55 of opposing similar sensor assemblies 45. More specifically, crop material traverses the leaf springs in a longitudinal fashion along a generally spiral path from the upstream end 81 to the downstream end 82. In this manner the degree of crop compaction is sensed as the preset bias is overcome and the leaf springs are urged toward the side walls. The position of the potentiometer rotor 67 will vary based on the position of its associated leaf spring as it moves toward or away from the side walls based on the force exerted by crop material passing thereover. This force is directly proportional to the degree of compactness of the crop material. The leaf springs in turn move the associated control arms of the potentiometers, thereby varying the potential in direct relationship to the compactness of the crop material being sensed which in turn is indicated by the display unit in the manner described above.

Thus, as the bale increases in size the compactness of the sides is monitored enabling the operator to, firstly, ascertain when the crop material has reached the desired level of compactness and, secondly, to modify the relative quantity of crop material being fed to the transverse sectors of the bale forming chamber in response to the relative levels indicated. For example, when a predetermined acceptable level is sensed by the left bale shape monitor, the operator is so apprised by an appropriate signal on the display unit.

If the degree of compactness on one side relative to the other is exceeded, he will steer the baler to the right to balance the levels.

While preferred structure incorporating principles of the present invention is shown and described above, it is to be understood that the invention is not limited to such structure, but that, in fact, widely different means of varying scope and configuration may be employed in the practice of the invention.

Having thus described the invention, what is claimed is:

1. In a round baler having an expandable bale forming chamber including opposing sidewalls between which generally cylindrically shaped packages of crop material are formed, a crop compaction sensor mounted on at least one of said sidewalls, said sensor including a leaf spring engageable with the crop material for sensing the degree of compaction of crop material in the vicinity of said at least one sidewall, a potentiometer having rotatable means for providing a variable signal corresponding to the position of said leaf spring relative to said sidewall, said leaf spring having an outermost position corresponding to no crop in the vicinity of said sensor and an innermost position corresponding to maximum crop compaction in the vicinity of said sensor, and intermediate apparatus for coupling said rotatable means of said potentiometer to said leaf spring, the improvement comprising said intermediate apparatus including a mounting bracket, and means for adjustably mounting said potentiometer on said mounting bracket to secure it to said bracket under conditions where said outermost position of said leaf spring corresponds to a range of positions at one end of travel of said rotatable means to enable the outermost position of said leaf spring to be calibrated to correspond to a selected position in said range of positions.

2. In a round baler as set forth in claim 1 wherein said mounting bracket is affixed to said at least one of said sidewalls and includes a surface extending generally perpendicular from the opposite side of said sidewall from said sensor.

3. In a round baler as set forth in claim 2 wherein said means for adjustably mounting said potentiometer on said surface is adapted to secure said potentiometer along a defined arcuate path, and said surface includes an opening, through which said rotatable means are accessible.

4. In a round baler as set forth in claim 3 wherein said mounting means includes bolts that extend through holding means integral with said potentiometer, and receiving means on the opposite side of said surface, adapted to secure said bolts adjacent said opening.

5. In a round baler as set forth in claim 4 wherein a second crop compaction sensor is mounted on the other one of said side walls, and facing said crop compaction sensor.

6. In a round baler as set forth in claim 5 wherein the leaf spring of each of said crop compaction sensors extends from its associated side wall into the path of crop material for engagement therewith as the cylindrically shaped package of crop material is being formed.

7. In a round baler as set forth in claim 6 wherein each leaf spring includes an upstream end and a downstream end relative to the direction of movement of said crop material being formed in said bale forming chamber, and means for securing said upstream end to its associated sidewall.

8. In a round baler as set forth in claim 1 wherein said sensor includes a pair of potentiometers corresponding respectively to first and second portions of said cylindrical package of crop material being formed in said bale forming chamber, each of said potentiometers being operable independently of the other to indicate the relative compactness of said first and second portions.

9. In a round baler having an expandable bale forming chamber including opposing sidewalls between which generally cylindrically shaped packages of crop material are formed, a crop compaction sensor mounted on at least one of said sidewalls, said sensor including a leaf spring engageable with the crop material for sensing the degree of compaction of crop material in the vicinity of said at least one sidewall, a potentiometer having rotatable means for providing a variable signal corresponding to the position of said leaf spring relative to said sidewall, said leaf spring having an outermost position corresponding to no crop in the vicinity of said sensor and an innermost position corresponding to maximum crop compaction in the vicinity of said sensor, said rotatable means rotatable urged to a home position corresponding to said no crop position of said leaf spring, and intermediate apparatus for coupling said rotatable means of said potentiometer to said leaf spring, the improvement comprising said intermediate apparatus including a mounting bracket, means for mounting said potentiometer on said mounting bracket to secure it to said bracket under conditions where said outermost position of said leaf spring corresponds to said home position of said rotatable means, an arm, pivotally mounted on said bracket, for sensing the position of said leaf spring, and intermediate means moveable with said rotatable means, said intermediate means urged against said arm to maintain said rotatable means in a predetermined position relative to said arm.

10. In a round baler as set forth in claim 9 wherein said arm includes a slot, and said intermediate means comprise a rocker arm having a pin extending therefrom for registration with said slot, whereby said pin is urged against against an edge of said slot regardless of the position of said arm.

\* \* \* \* \*